United States Patent Office 3,231,326
Patented Jan. 25, 1966

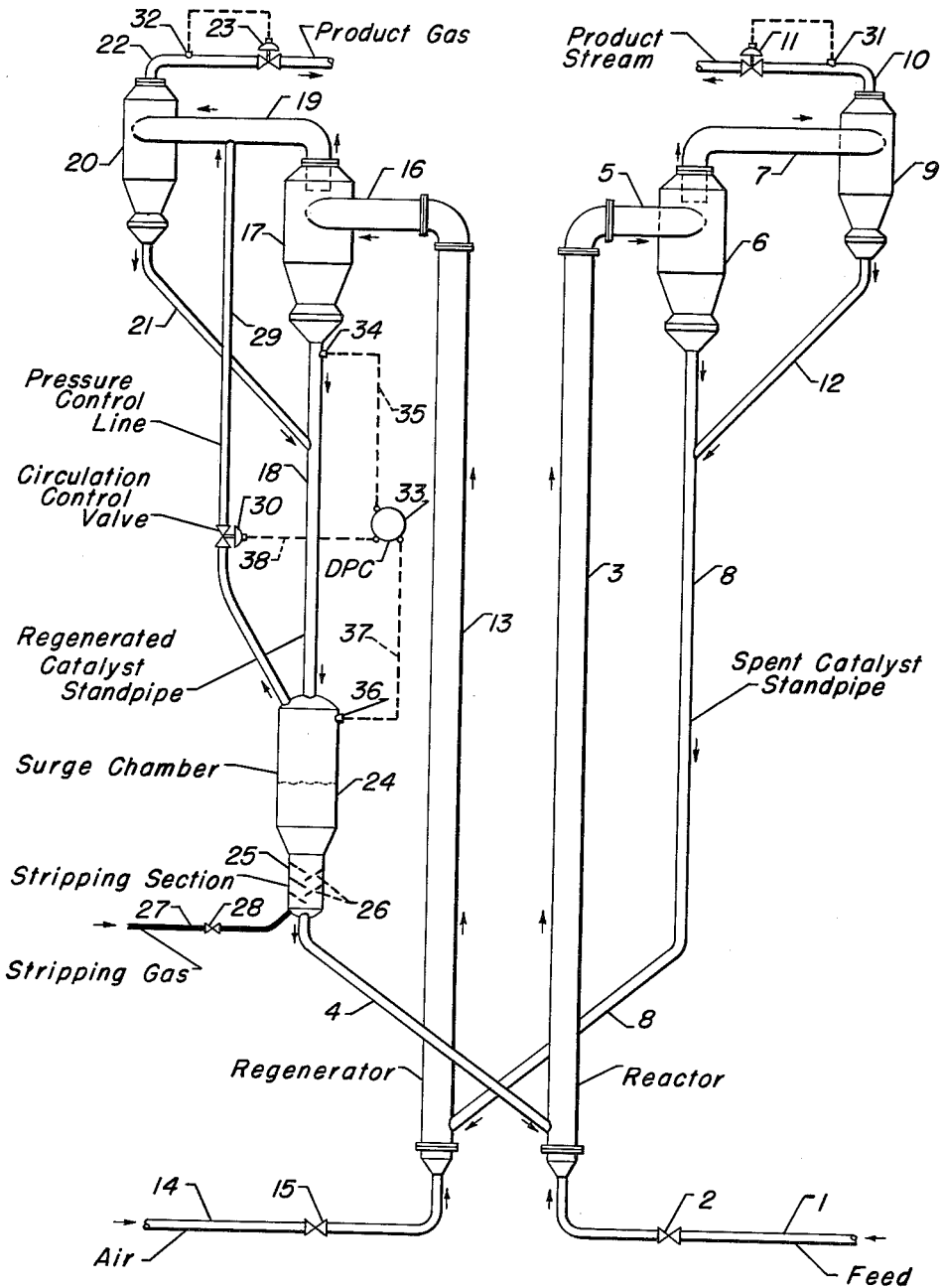

3,231,326
METHOD AND MEANS FOR CONTROLLING PARTICLE CIRCULATION RATE IN A DILUTE PHASE PROCESSING SYSTEM
Laurence O. Stine, Western Springs, and Harold W. Bergendorf, Melrose Park, Ill., assignors to Universal Oil Products Company, Des Plaines, Ill., a corporation of Delaware
Filed June 1, 1962, Ser. No. 199,528
4 Claims. (Cl. 23—1)

The present invention is directed to means for controlling the particle circulation rate in a dilute phase processing system and more specifically to a system which eliminates standpipe slide valves and utilizes freely flowing spherical particles, such as micro-spherical particles, whereby the control of the pressure in a descending column of particles may be used to control the rate of transfer of the particles to a succeeding contacting zone.

Various commercial processing operations in the petroleum and chemical fields have utilized continuously operating fluidized systems for effecting catalytic conversion of a hydrocarbon reactant stream, or to carry out chemical reactions, through the use of a two-vessel arrangement such as a reactor and regenerator, where catalyst is successively transferred from one zone to the other. Such catalyst assisting in effecting a desired catalytic reaction while in a fluidized contact with a reactant stream in a reactor chamber and being decarbonized or regenerated and reheated while in a fluidized contact with a reactivating stream in a regeneration chamber. Fluidized operations, as typified by fluidized catalytic cracking of gas oils, are well known in the petroleum arts and need not be described in detail herein. Most present day commercial units have utilized "hindered settling" or relatively dense phase bed processing operations within the contacting chambers, however, similar reactions and conversions may be carried out in a "dilute phase" operation, wherein particles are carried entirely overhead from the respective contacting chambers in a continuously upwardly moving relatively low density fluidized bed or column of particles. For example, the catalytic conversion of methane to hydrogen and carbon has been successfully carried out in a dilute phase system wherein methane or other light gaseous hydrocarbon stream contacts heated catalyst particles in a rising dilute phase column passing through a vertically elongated reaction chamber, and wherein resulting contacted catalyst particles are similarly contacted and carried with an oxygen containing stream in a rising column through a vertically elongated regeneration chamber. Particles separated from the respective overhead product streams are collected and transferred by suitable standpipes to the lower ends of the appropriate contact chambers for continuous circulation through the system.

Fluidized conversion systems using two contact zones generally make use of differential pressure and level control means to regulate particle circulation rates between zones, with such control means in turn operating slide valves in the transfer lines to effect the actual regulation of particle flow. Prior art teachings and the earlier methods of operations were primarily concerned with powdered particles or catalyst which depended upon aeration to preclude compaction and to cause the particles to take on the aspects of a liquid column capable of exerting a variable hydrostatic or "fluistatic" pressure. In other words, each transfer line has made use of the multiple injection of an aeration medium to insure movability and fluidization of the particles in the particle transfer standpipes. Spherical particles of catalyst, which have been referred to hereinbefore, have in part eliminated the necessity for extensive fluidization in such transfer lines. However, actual circulation rate control has primarily relied upon the use of controlled slide valve means.

In a few present conversion systems which have fluidized dense phase beds in the contacting chambers, there has been the elimination of slide valves in the descending catalyst transfer lines by the use of U-tube type of transfer lines between zones such that a gas seal has been formed between the zones. In each case, a driving force to move particles from one zone to another has involved the use of fluistatic pressure in a standpipe section together with the introduction of a fluidizing stream into a riser section, with such gas being introduced at a substantial distance above the bottom of the U-tube section. Thus, in such a system the particle circulation rate is controlled by regulation of the reactant gas introduction rate to one riser section or another, or into both riser sections of a two-vessel system. The density or pressure in the descending portion of the U-tube section is maintained substantially constant and not changed with variations in circulation rates.

It is a primary object of the present invention to provide a variable standpipe pressure control method for controlling the circulation rate of catalyst, or other particulated material, in a processing system using dilute phase overhead transfer of particles from the contact zones and the elimination of slide valves in the respective standpipes used to transfer contacted particles to the other or next successive contacting zone in the system.

It is also an object of the invention to provide adjustable control means in a pressure control line which is maintained in a substantially parallel arrangement with one of the standpipes in the system whereby pressure can be allowed to build-up, or be relieved, to in turn cause high or low particle circulation rates within the system.

In a broad embodiment, the present invention provides in a fluidized particle processing system wherein a reactant stream effects a fluidized contact with subdivided particles in one contact zone and resulting contact particles descend in a moving column to enter into a second zone for fluidized contact with a different stream, and wherein particles from such second zone are returned in a descending moving column flow to the first contact zone, the improved method for controlling the rate of particle circulation between zones which comprises, introducing such particles from the lower end of one of the moving columns into an enlarged surge zone positioned ahead of and connective with the other of the contacting zones, adjustably increasing and relieving pressure on such surge zone to regulate fluistatic pressure therein, and thereby providing a direct control of the rate of circulation of particles in the system without changing the rate of introduction of a reactant stream thereto.

Inasmuch as the present improved method of controlling circulation of particles may apply to inert material as well as catalysts, then such control system may apply to various thermal conversion or heat treating systems, as well as to catalytic conversions used in the petroleum and chemical industries as hereinbefore pointed out. Actually, the placement of a surge zone in combination with a descending column of particles may be utilized in connection with the contacted particles being removed from a reaction chamber for transfer to a regeneration chamber, or conversely, may be utilized in combination with a standpipe from a regeneration or reheating zone prior to return of the particles to the reaction zone. In catalytic cracking, catalytic reforming, dehydrogenation, and the like, where it is advantageous to strip catalyst particles of occluded materials prior to their being sent to a regeneration zone, it may be considered of advantage to position a surge-stripping chamber in connection with a spent catalyst standpipe such that the circulation rate and stripping is controlled within the system by having the means for increasing or decreasing pressure on the surge zone ahead of the regenerator. On the other hand, in a catalytic hydrogen producing system where it is advantageous to strip reactivated and reheated catalyst particles passing from the regeneration zone, in order to preclude the transfer of carbon oxides to the reaction zone, then it may be of particular advantage to place a surge-stripping zone in combination with a regenerated catalyst standpipe section. In other words, the present control means with a pressure relief line and valving means, may be placed in any standpipe portion of the dilute phase system and circulation control maintained throughout. The circulation rate adjusts itself in both the upstream and downstream contacting chambers in accordance with control regulated in the one standpipe of the system.

An apparatus embodiment of the present invention provides in combination with a fluidized particle apparatus system, wherein a reactant stream effects a fluidized contact with subdivided particles in a vertically elongated contacting chamber and resulting contacting particles therefrom descend in a confined column through a vertically elongated standpipe, the lower end of which communicates with inlet means to a second contacting chamber for effecting a fluidized contact of the particles with a different reactant stream therein, resulting contacted particles from the second contacting chamber pass into and descend in a confined column through a second standpipe having its lower end connecting with inlet means to the first contacting chamber, and product streams are separated from the subdivided particles in separating means at the outlet ends of the first and second contacting chambers, the improved apparatus arrangement for regulating the rate of particle circulation in said system, which comprises, an enlarged diameter surge chamber connecting at the lower end of one of said standpipes carrying contacted particles from one of said chambers, an additional conduit means connecting between said surge chamber and the inlet section to the upper end of such standpipe, an adjustable valve means positioned in said additional conduit means whereby the pressure at the lower end of said standpipe and in said surge chamber may be adjustably controlled and the rate of flow of particles to the other end of the contact chamber in turn regulated directly responsive to the pressure in such surge chamber.

Inasmuch as the control system provides for the build-up of pressure, or the relief of pressure, in one of the standpipes of the system it is possible to relieve pressure through an adjustably controlled vent line which may be connected with either one of the standpipes of the two-vessel system. However, in accordance with the foregoing embodiment and in a preferred apparatus arrangement, the pressure control line from a surge zone is connected with an upper portion of the standpipe itself or with the particle separation means at the upper end of the particular standpipe and the connecting contacting chamber such that the gas from the lower portion of the standpipe or the surge-stripping zone, combines with and passes from the system along with the main product stream from the particular chamber. For example, the pressure control, or pressure relief line, may carry a stripping medium and stripped gaseous and vaporous compounds to the upper end of the separating equipment or to the product stream outlet line from which the contacted particles are separated.

Reference to the accompanying drawing and the following description thereof will serve to more clearly illustrate the present control system and the advantages gained therefrom in combination with a continuously operating fluidized dilute phase operation. The drawing is diagrammatic, illustrating merely one embodiment of a two-vessel dilute phase processing system indicating the use of a catalyst in effecting the conversion of a reactant stream.

Referring now to the drawing, there is indicated line 1, having control valve 2, to carry a feed stream into the lower end of the vertically elongated pipe-like reaction chamber 3. By way of example, it may be assumed that the feed stream is methane or other light gaseous hydrocarbon stream for producing hydrogen in the presence of a suitable decomposition catalyst and at high temperature. The reactant stream rises through the reaction chamber 3 in contact with catalyst particles flowing into the lower end of the chamber from standpipe line 4 such that a relatively light phase, or dilute phase mixture of gas and catalyst moves continuously upwardly and outwardly from the top end of chamber 3 into transfer line 5 and particle separating chamber 6. In the present embodiment, the chamber 6 provides a first stage of separation with a hydrogen rich gaseous stream being carried overhead to line 7 and contacted catalyst particles descending through standpipe 8. A second stage of separation is effected in separator 9 connecting with transfer line 7, such that a substantially particle free product stream carries overhead through line 10, having control valve 11, while additional separated catalyst particles pass from the lower end of separator 9 through line 12 into standpipe 8.

Contacted and carbonized catalyst particles flow continuously from the lower end of the standpipe 8 into a regeneration chamber 13 and into a rising air or oxygen containing stream being introduced through line 14, having control valve 15. A resulting dilute phase catalyst-air stream carries upwardly through the vertically elongated regenerator 13 such that all of the catalyst particles with at least a portion of the carbon or coke deposition being removed carry into transfer line 16 and to particle separator 17. The rate of air or oxygen introduction to the regenerator is controlled to provide oxidation and gasification of carbon deposition on the catalyst particles as well as a thermal balance in the system, with the reheated catalyst particles of reduced carbon content being returned to the reaction chamber.

The first stage separator 17 passes separated catalyst particles from the lower end thereof into a standpipe 18 while the gaseous product stream, rich in carbon monoxide, is carried overhead into line 19 to a second stage separator 20. Recovered particles from the latter pass through transfer line 21 to the standpipe 18, while the resulting regeneration product gas stream passes overhead through outlet line 22, having control valve 23.

Regenerated catalyst standpipe 18 passes the heated catalyst particles in a descending vertical column to the upper end of a surge-stripping chamber 24 which has a baffled lower stripping section 25. The latter has internally positioned side to side plates 26 and a lower stripping inlet line 27 and control valve 28. The stripping medium passed through line 27 to section 25 may comprise an inert gas such as nitrogen, although preferably in a hydrogen producing process a portion of the hydrogen product stream from line 10 is used as a stripping gas to effect the removal of occluded carbon oxides and perhaps some reduction of the catalyst being transferred back to the reaction zone. Resulting reactivated and stripped catalyst particles pass from the lower end of the stripping chamber 25 to the transfer conduit 4 for introduction to the lower end of reaction chamber 3 as hereinbefore described.

For hydrogen production, the catalyst may comprise alumina, silica-alumina, or other refractory base material impregnated with a metallic decomposition catalyst component, such as nickel, iron or cobalt. The temperature is higher than that utilized in the cracking of hydrocarbons being above about 1200° F. and preferably within the 1400° to 1700° F. range, whereby a rapid efficient decomposition is effected in the reaction zone. Thus, regeneration is effected in chamber 13 at conditions providing the catalyst temperature in the preferred range for introduction into the lower end of the reaction chamber 3.

Various pressures may be utilized in effecting the continuous processing system, however, where a fluidized particle operation is effected it is generally of advantage to utilize low superatmospheric pressures in order to minimize metal thicknesses and the cost of apparatus making up the system. Lower pressures also permit lower costs in the blowers and compressors or pumps for the air blowing and feed introduction sections. By way of example, the vertically elongated reactor 3 may carry a pressure of approximately 10 pounds per square inch at the upper end and in the zone of the transfer line 5, while the pressure at the lower end of the chamber is of the order of 12 p.s.i. At the lower end of the standpipe section 4, where the activated catalyst enters the lower end of reaction chamber 3, the pressure is necessarily equivalent to the 12 p.s.i. pressure in the lower end of chamber 3; in other words from the 12 to 14 pound range. This permits catalyst to be readily transferred and lifted to the top of reactor 3 by the feed stream flow through line 1 and substantially precludes reactant stream flow into standpipe 4. Similarly, the pressure at the bottom of the standpipe 8 may be in the order of 12 to 14 p.s.i., while in regenerator 13 the pressure may be approximately 13 p.s.i. at the lower end thereof and 11 p.s.i. at the upper end thereof. Pressure in the lower end of transfer standpipe 18 and in surge chamber 24 may be of the order of 12 to 13 p.s.i. while in the lower end of standpipe 4 connecting with the lower end of the surge-stripping chamber the pressure is of the order of 12-14 p.s.i. as aforesaid.

In any one steady state operation, with the feed rate holding constant through line 1, air introduction held constant from line 14, product stream held constant through line 10 and valve 11, and regenerator gas flow through line 22 and valve 23 likewise held constant, then catalyst circulation in the unit becomes equalized in the reactor and regenerator chambers as well as through their respective standpipes depending upon the differential pressure existing between the two contact zones. In accordance with the present invention, circulation is regulated without the use of slide valve means by regulating pressure in the lower portion of one of the standpipe lines and in the present embodiment by varying pressure in the surge-stripping chamber 24 connecting with transfer line 4 and the end of reactor 3. In order to control pressure in the surge chamber 24, a pressure control line 29, with control valve 30, connects between the upper portion of chamber 24 and transfer line 19 carrying the product gas stream from the upper portion of the regenerator. Thus, where valve 30 is maintained substantially closed the pressure in the standpipe 18, surge chamber 24 and standpipe section 4 maintains a normal fluistatic pressure provided by the density in the descending column of catalyst particles in the standpipe sections and the overall height of the particular apparatus. Such fluistatic pressure in line 4 in turn regulates the flow of particles into the lower end of the reaction chamber 3 and the subsequent outlet flow from the top of the reactor into separator 6 and into the spent catalyst standpipe 8. The entire flow in the system balancing to a steady state operation in accordance with slight differential pressures maintained between the two vessels of the system. On the other hand, with the partial opening of the valve 30 in line 29, there is a relief of pressure in the surge chamber 24 and reduction in the fluistatic pressure resulting in the lower standpipe section 4, together with a slowing down of the catalyst circulation rate from the latter into reactor 3 and in the system.

The pressure reduction at the surge chamber location may be varied in accordance with the differential pressure possible between the pressure in the regenerator gas outlet section, as for example pipe 19 as compared with that at the lower end of standpipe 18. Such pressure variation may be of the order of 1 p.s.i. to 3 or 4 p.s.i. depending upon the pressure differential which may exist in a particular standpipe such as line 18. The differential pressure, however, will generally be in accordance with the density of particulated materials being circulated and the height of the equipment as well as with the extent of fluidization or compaction permitted in a descending column of material in the standpipe In connection with synthetically made spherical catalyst particles, there is generally no bridging or compaction of material where the catalyst has been subjected to a prior fluidization and there is in effect a film-like layer of a gaseous medium surrounding each particle, without the addition of an aerating medium at the bottom of the standpipe. The present control system in combination with a dilute phase apparatus unit, such as described herein, contemplates that there need be no intentional introduction of aerating medium at the bottom of either of the standpipe lines, however, with certain catalysts or particulated material which may not be as freely flowing as others, it may be necessary or advisable to introduce minimal quantities of aerating medium into the standpipe and the descending columns of particles. When no stripping gas is introduced to the system, then circulation control valve 30 may be closed at times, but when stripping gas is introduced continuously to the system, then the valve should, in general, be partially open at all times to preclude any excessive build-up of gas pressure in the standpipe 18 and loss of the gas seal between the top of the surge section 24 and the cyclone separator 17.

In an automatic particle circulation control arrangement, means is provided to hold the feed and air inlet streams constant while the product streams may be held to a substantially constant flow rate by a flow indicating means 31 connecting to automatic control valve 11, and similar flow indicating means 32 connects with control valve 23. At standpipe 18, a differential control means 33 connects with an upper pressure tap 34 by line 35 and to a pressure tap 36 in the surge chamber 24 by line 37. This provides means for establishing the differential pressure between the upper and lower portions of standpipe 18. The differential pressure controller 33 in turn connects through line 38 with valve 30 to effect an automatic adjustment of such valve to maintain a substantially uniform differential pressure on the standpipe 18 and resulting desired uniform circulation rate of particles in the system. The differential pressure control 33 may, of course, be adjusted to varying desired differential pressures to in turn provide increasing or decreasing circulation rates by closing or opening to a greater extent valve 30 such that circulation rates will vary directly in accordance with the fluistatic pressure maintained in the lower portion of the spent catalyst transfer line. In other words adjusting the controller 33 to a low differential will increase the opening in the valve 30, decrease the pressure in surge chamber 24 and decrease circulation rate therefrom to the reactor 3 of the system. Conversely, increasing the differential pressure requirements by controller 33 so as to substantially close valve 30 will effect an increase in the fluistatic pressure resulting in surge chamber 24, and in the lower portion 4 of the spent catalyst standpipe, whereby there is an increased circulation from the latter into reactor 3 and a higher increased steady state circulation rate throughout the system.

*Example I*

Catalyst circulation tests were carried out in a small scale pilot unit constructed and arranged in a manner similar to the accompanying drawing, except for the incorporation of the pressure relief line (such as line 29 with valve 30). The test unit had an elongated vertically positioned tube or pipe section of 1 inch diameter and a 20 foot length used as one contact chamber and a three-quarter inch diameter accompanying standpipe to receive the overhead transfer of catalyst. A 1½ inch diameter by 20 foot long vertically positioned pipe section was used as a second contact chamber and a three-quarter inch diameter tube section was connected therewith to be used as a standpipe section to receive catalyst from such second contact chamber. An enlarged 3 inch diameter by 3 foot long surge-stripping section, with a baffled lower stripping portion, was positioned in the lower end of the last-mentioned standpipe section to serve as a storage-stripping zone in the system. A manometer tube was connected with the lower end of the standpipe section having the surge-stripping section therein in order to provide readings of pressure in the standpipe section just below the stripping zone. Inlet lines were provided to the lower ends of each of the vertical contact tubes in a manner similar to the feed and air inlet lines indicated on the accompanying drawings, while similarly, gas outlet lines were provided from particle separators at the top ends of the respective contacting tubes. Thus, feed and catalyst circulation operations could be carried out in a manner similar to an actual gas conversion process. Adjustable valves in each of the standpipes were left wide open in order that catalyst circulation rates could be determined for different pressure conditions in the standpipe sections.

In one test operation, the gas feed rate to the contact tube was held constant at a 16.7 feet per second superficial velocity, and a nitrogen stripping stream rate was held constant at 20 cubic feet per hour into the stripping section of the surge-stripper maintained in one standpipe. With a manometer reading of 31.7 inches of water, as the pressure in the surge-stripper, there was found to be a catayst circulation of 670 pounds per hour in the system.

*Example II*

In another test run using the test apparatus as described in Example I, the gas feed rate to the contact tube was held to the same 16.7 feet per second superficial velocity and the nitrogen stripping feed rate to the surge-stripper was also held at 20 cubic feet per hour (i.e., feed rates were the same as those set forth in Example I); however, the pressure in the surge-stripper zone was permitted to be increased to 47.5 inches of water. The catalyst circulation rate for this test was measured at 910 pounds per hour through the system.

*Example III*

In still another test run using the test apparatus as described in Example I, the gas feed rate to the contact tube was held to the 16.7 feet per second superficial velocity and the nitrogen stripping feed rate to the surge-stripper was held at 20 cubic feet per hour; however, the pressure in the surge-stripper zone was permitted to be increased to 63.4 inches of water. The catalyst circulation rate for this test measured at 1,080 pounds per hour through the system.

*Example IV*

In another test operation, in the same test apparatus the gas feed rate to the contact tube was adjusted and held constant at an increased rate of 25.2 feet per second superficial velocity, while the nitrogen stripping rate was also increased to 40 cubic feet per hour. With the pressure in the surge-stripper zone at 22.2 inches of water, the catalyst circulation rate was measured at 800 pounds per hour through the apparatus system.

*Example V*

The test run of this example was carried out with the same gas feed rate and nitrogen stripping rate set forth in Example IV; however, the surge-stripper pressure was increased to 29.2 inches of water. The circulation rate for this increased pressure was measured to be 910 pounds per hour through the system.

From the foregoing examples, it may be readily observed that pressure adjustments in the descending moving column of particles in the lower end of a standpipe section may be used to directly adjust and control the rate of circulation of the particles in the contacting system.

We claim as our invention:

1. In a fluidized particle processing system wherein a reactant stream effects a fluidized contact with subdivided particles in one contact zone and resulting contacted particles descend in a moving column to enter into a second contact zone for fluidized contact with a different reactant stream, and particles from such second zone are returned in a descending moving column flow to the first contact zone, the improved method for controlling the rate of particle circulation between zones without the use of a flow control valve in the path of the particles, which comprises, introducing such particles from the lower end of one of said moving columns into an enlarged surge zone positioned ahead of and connective with the other of said contact zones and having vent means provided with valve control means, and adjustably increasing and relieving pressure on said surge zone by said valve control means to regulate fluistatic pressure therein and provide a direct control of the rate of circulation of particles from the latter to said connecting contact zone and in said system without changing the rate of introduction of a reactant stream thereto.

2. In a fluidized particle processing system wherein a reactant stream effects a fluidized contact with subdivided particles in one contact zone and resulting contacted particles descend in a moving column to enter into a second contact zone for fluidized contact with a different reactant stream, and particles from such second zone are returned in a descending moving column flow to the first contact zone, the improved method for controlling the rate of particle circulation between zones without the use of a flow control valve in the path of the particles, which comprises, introducing such particles from the lower end of one of said moving columns into an enlarged surge zone positioned ahead of and connected with the other contact zones and having vent means provided with valve control means, measuring differential pressure across at least a portion of the heighth of such descending moving column of particles above the surge zone and adjustably increasing and relieving pressure at the lower end of such column by said valve control means responsive to changes in differential pressure measurements to effect a desired directly responsive change in the particle circulation rate in the processing system.

3. In a fluidized particle apparatus system wherein a reactant stream effects a fluidized contact with subdivided particles in a vertically elongated contacting chamber and resulting contacted particles therefrom descend in a confined column through a vertically elongated standpipe the lower end of which communicates with inlet means to a second contacting chamber for effecting fluidized contact of the particles with a different reactant stream therein, resulting contacted particles from said second contacting chamber pass into and descend in a confined column through a standpipe having its lower end connecting with inlet means to said first contacting chamber, and product streams are separated from the subdivided solid particles in separating means at the outlet ends of said first and second contacting chambers, the improved apparatus arrangement for regulating the rate of particle circulation in said system without the use of a flow control valve in the path of the particles, which comprises in combination, an enlarged diameter surge chamber connecting with the lower end of one of said standpipes carrying contacted particles from one of said chambers, an additional conduit means connecting between said surge chamber and the inlet section to the upper end of such standpipe, and an adjustable valve means positioned in said additional conduit means whereby the pressure at the lower end of the standpipe and in said surge chamber may be adjustably controlled and the rate of flow of particles to the inlet end of the other contact chamber in turn regulated directly responsive to the pressure in such surge chamber.

4. The apparatus of claim 3 further characterized in that differential pressure control means connects with pressure taps connective with vertically spaced points in said standpipe having said surge chamber and said differential pressure control means also connects with said adjustable valve means positioned in said additional conduit means, whereby such valve is automatically adjusted responsive to changes in differential pressure measurements from said differential pressure control means.

References Cited by the Examiner

UNITED STATES PATENTS

| 2,439,811 | 4/1948 | Jewell | 23—288.3 |
| 2,456,148 | 12/1948 | Read | 23—1 |
| 2,587,554 | 2/1952 | Weikart | 23—288.3 |
| 2,599,197 | 6/1952 | Frescott | 23—288.3 |
| 2,677,604 | 5/1954 | Nelson | 23—1 |
| 3,067,131 | 12/1962 | Bergstrom | 23—288.3 |

OTHER REFERENCES

Othmer book on "Fluidization," 1956 edition, page 124, Reinhold Pub. Corp., N.Y.

MAURICE A. BRINDISI, *Primary Examiner.*